FM/AM CONVERTERS
Filed Nov. 30, 1964
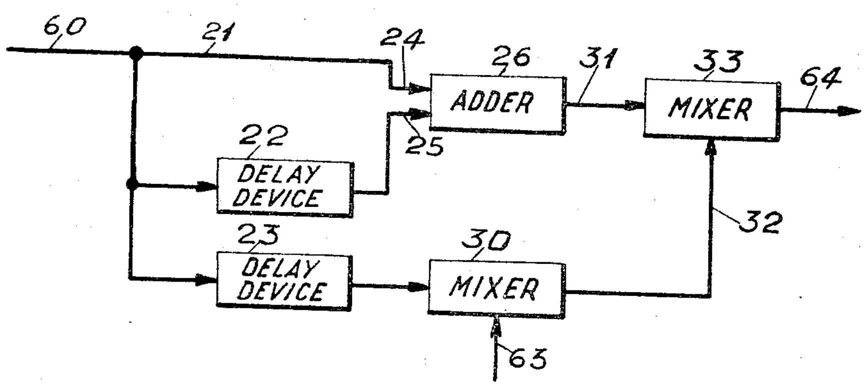
INVENTORS.
GÉRARD MELCHIOR
PIERRE CASSAGNE
BY Kurt Kelman
Agent United States Patent Office 3,348,168
Patented Oct. 17, 1967

3,348,168

FM/AM CONVERTERS

Gérard Melchior and Pierre Cassagne, Levallois, France, assignors to Compagnie Francaise de Television, a corporation of France Filed Nov. 30, 1964, Ser. No. 414,814
Claims priority, application France, Dec. 3, 1963, 955,788
4 Claims. (Cl. 332—1)

The present invention relates to FM/AM converters. More particularly, it is an object of the present invention to provide an FM/AM converter, for converting—without demodulation—a wave, which is frequency modulated by a signal $M(t)$ into an amplitude modulated wave of the suppressed carrier type, with a predetermined value F1 of the carrier frequency, and without any phase modulation, in other words, into a wave of the form $k.M(t) \sin (w_1t+P)$, where $w_1$ is a predetermined angular frequency, and $k$ and P two constants.

Such a converter is particularly useful as one of the elements of a system for converting the subcarrier of the SECAM system into a subcarrier of the general NTSC type.

It will be briefly recalled that the complex video-signal of the SECAM system includes a wide-band luminance signal Y, and a subcarrier, the latter being alternately frequency-modulated by two colour signals C1 and C2, alternating at the line frequency.

In colour receivers, signals C1 and C2 are made simultaneous by alternately repeating one of them, before or after subcarrier demodulation and by means of a delay device, during the transmission periods of the other. The repeated signals $C1(t-T)$ or $C2(t-T)$, where T is the line period, relative to the previously explored picture line are assimilated to the signals relative to the picture line being actually explored.

By "subcarrier of the general NTSC type" is meant a wave of the form $$S=k'.C1 \sin (w_1t+Q')+k''.C2 \sin (w_1t+Q'')$$

where $k'$, $k''$, $w_1$, $Q'$ and $Q''$ are constants; as concerns $Q'$ and $Q''$, their exact values do not matter, provided $Q'-Q''$ has an assigned value.

Of course, signal S can be obtained only if the repeated signals $C1(t-T)$ and $C2(t-T)$ are respectively assimilated, as is always the case in the receivers of the SECAM system, to signals $C1(t)$ and $C2(t)$.

The problem of obtaining signal S arises, among others, in the receivers with a picture tube of the single gun type.

Another important case necessitating a signal S of the above mentioned type occurs when it is desired to convert received SECAM type signals to NTSC type signals, in order, for example, to ensure their retransmission on a network operated according to the latter system.

To obtain signal S, one can demodulate the frequency-modulated subcarrier and modulate in amplitude two out-of-phase carrier waves.

This amplitude modulation has to be effected by means of modulators supplying the modulation products (sidebands) without passing the carrier ("suppressed carrier" modulation).

Modulators of this kind, known as "balanced" modulators, are complicated, adjusted with difficulty and are often unstable; the fact that two are required in the particular case under consideration introduces further drawbacks.

Another drawback in proceeding by demodulation followed by remodulation arises from an accumulation of non-linear distortions produced by these operations.

It is thus preferred to effect a direct conversion of modulation, but this modulation conversion must fulfil the above mentioned requisites.

Such a modulation conversion may be effected before or after the subcarrier has been repeated.

In the first case, there will first be obtained at the two outputs of a repetition and switching device of the most general type used in the receivers of the SECAM system two modulated waves, the first of which is frequency-modulated by a signal which is alternately $C1(t)$ and $C1(t-T)$, and the second of which is frequency-modulated by a signal which is alternately $C2(t)$ and $C2(t-T)$. It will suffice to use two FM/AM converters to obtain two amplitude-modulated waves from which it will be easy to derive signal S.

In the second case, the frequency-modulated wave to be converted will be modulated by a signal which is alternately $C1(t)$ and $C2(t)$. Through repetition of the corresponding amplitude-modulated wave and other suitable transformations, and a proper switching, signal S may also be obtained.

It is thus an object of the present invention to provide an FM/AM converter suitable for use in colour television subcarrier circuits of the above mentioned type, although of course its use is not restricted to this application.

According to the invention, there is provided an FM/AM converter for converting a wave of constant amplitude, which is frequency modulated by a signal $M(t)$ into an amplitude modulated wave of the suppressed carrier type, of the form $k.M(t) \sin (w_1t+P)$, where $k$, $w_1$ and P are constants, said FM/AM converter comprising: a first general input for receiving said frequency modulated wave, said first general input feeding (a) a direct channel, (b) a first delayed channel comprising a delay device imparting a delay having a duration $s$ equal to that of a whole number N of half cycles of the resting frequency $Fo$ of the frequency modulated wave, and (c) a second delayed channel comprising a delay device imparting a delay having a duration $s/2$; a device which is an adder if N is odd, and a subtractor if N is even, having two inputs respectively coupled to the outputs of the direct channel and of the first delayed channel; a second general input; means for applying to said second general input a sinusoidal wave of angular frequency $w_1$; and a frequency changing arrangement having three inputs respectively coupled to the outputs of said device, to the output of said second delayed channel, and to said second general input, for combining the three input signals of said frequency changing arrangement in order to supply said amplitude modulated wave.

The invention will be better understood and other characteristics will become apparent from the following description and the accompanying figure which shows an embodiment of an FM/AM converter according to the invention.

In the circuit of FIG. 1, the frequency-modulated osillation is applied to an input 60, this oscillation having a constant amplitude.

Input 60 feeds in parallel a direct channel 21, shown diagrammatically by a single wire, and a delayed channel shown diagrammatically by a simple delay device 22, imposing on its input signals a delay $s$. These two channels are provided with amplifiers (not shown) which ensure equality of their respective gains. Their outputs are respectively connected to the two inputs 24 and 25 of an adder 26. The output of adder 26 is connected to the first input 31 of a frequency converter or "mixer" 33.

Input 60 is also connected to a delay device 23 imposing on its input signals a delay of $s/2$.

The output of device 23 is connected to the first input of a frequency converter 30, whose second input 63 receives a local oscillation of constant amplitude and of fixed angular frequency $w_1$.

The output of frequency converter 30 is connected to the second input 32 of a frequency converter 33 whose output 64 corresponds to that of the FM/AM converter.

The system operates as follows:

The input signal applied to input 60 can be expressed by:

$$E \sin [w_0 t + \phi(t)]$$

where $w_0$ is the resting frequency of the oscillation and where $$w_0 + \frac{d\phi(t)}{dt}$$

is the instantaneous frequency $w_i$ of the oscillation, the difference $$w_i - w_0 = \frac{d\phi(t)}{dt}$$

thus being proportional to the modulating signal $M(t)$.

At instant $t$ delay device 22 supplies the signal $$E \sin [w_0(t-s) + \phi(t-s)]$$

The delay $s$ in this example is equal to $\pi/w_0$, i.e. to the duration of a half-cycle of the carrier frequency.

Taking this fact, into account calculations give for the signal supplied by adder 26, and which is the sum of its two input signals $$2E \sin \left[ w_0 t - \frac{w_0 s}{2} + \frac{\phi(t)+\phi(t-s)}{2} \right] \cos \left[ \frac{w_0 s}{2} + \frac{\phi(t)-\phi(t-s)}{2} \right] = +2E \sin \frac{\phi(t)-\phi(t-s)}{2} \cos \left[ w_0 t + \frac{\phi(t)+\phi(t-s)}{2} \right]$$

It is justifiable to admit that during the time $s$ (corresponding to one half-cycle of the resting frequency) the modulating signal $M(t)$ and consequently the derivative $$d\phi(t)/dt$$

can be taken as constant, in other words that during the time intervals $t-s$ to $t$ on the one hand and $t$ to $t+s$ on the other, $\phi(t)$ varies linearly with time.

There results immediately that $$\frac{\phi(t)+\phi(t-s)}{2} = \phi(t-s/2)$$

and that:

$$\frac{\phi(t)-\phi(t-s)}{2} = \frac{s}{2}\frac{d\phi(t)}{dt} = kM(t)$$

where $k$ is a constant.

Also:

$$\frac{s}{2}\frac{d\phi(t)}{dt} = \frac{\pi}{2w_0}[w_i(t) - w_0]$$

Provided the frequency differences $w_i - w_0$ are small compared to the carrier frequency $w_0$, the usual approximation $\sin x = x$ can be made, viz:

$$\sin \left[ \frac{s}{2} \cdot \frac{d\phi(t)}{dt} \right] = \frac{s}{2}\frac{d\phi}{dt} = kM(t)$$

It should be noted that if the above-mentioned condition were not fulfilled, this could be secured by a translation to a higher frequency of the frequency-modulated oscillation before it is applied to the FM/AM converter.

Under these conditions the output signal from adder 26 can be finally expressed by:

$$+kM(t) \cos [w_0 t + \phi(t-s/2)]$$

Further, the delay device 23 supplies the signal $$E \sin [w_0(t-s/2) + \phi(t-s/2)]$$

which beats in the adding mixer 30 with the local oscillation $w_1$ to supply a signal whose phase, to within a constant, is:

$$(w_0 + w_1)t + \phi(t-s/2)$$

This oscillation is applied to the input 32 of subtractive mixer 33, where it beats with the output oscillation from adder 26 applied to the input 31 of this mixer. The latter delivers a signal whose amplitude is $M(t)$, to within a constant coefficient, and whose phase is, to within the same constant;

$$(w_0 + w_1)t + \phi(t-s/2) - w_0 t - \phi(t-s/2) = w_1 t$$

i.e. $KoM(t) \sin (w_1 t + \theta)$, where $Ko$ and $\theta$ are constants.

In this way, modulation conversion has been secured, the modulated signal corresponding to the suppressed carrier signal supplied by a balanced modulator.

The arrangement just described can have some modification.

First, as regards the frequency changes made with a view to obtaining the fixed frequency $$F_1 = \frac{w_1}{2\pi}$$

For example, frequency converter 30 which effects the angular frequency transposition $+w_1$ could be inserted between the ouput of adder 26, and an input of frequency converter 33, the other input of frequency converter 33 being then directly coupled to the output channel 23, and the output filter of frequency converter 33 remaining centered on frequency $w_1$.

Also, the delay $s$ may be modified by making it equal to the duration of an odd number of half-cycles of the carrier angular frequency $w_0$ to secure higher sensitivity. But this delay must not have a duration such that the approximations made in the case for which $s$ corresponds to the duration of a half-cycle of the angular frequency $w_0$ would no longer be admissible.

It can be easily verified that the phase relations just described remain valid.

The delay $s$ can also be made equal to the duration of a whole number of cycles of the angular frequency $w_0$, provided adder 26 is replaced by a substractor.

The output signal from the substractor then has the same expression as that which was supplied by the adder in the arrangement just described, and the remainder of the arrangement is unchanged.

A duration $s$ corresponding to the duration of one cycle of the resting frequency can be used, for example, if a duration of one half-cycle provides insufficient sensitivity, and if a duration of three half-cycles is excessive for the approximation $\sin x - x$.

What is claimed is:

1. An FM/AM converter for converting a wave modulated in frequency by a signal $M(t)$ in an amplitude modulated suppressed carrier wave of the type $$k.M(t) \sin (w_1 t + P)$$

wherein $k$, $w$ and P are constants, said converter comprising a first general input for receiving said frequency-modulated wave; a first channel coupled to said general input; a second channel coupled to said general input; said second channel comprising means for impressing on a signal propagating therethrough a delay $s$ equal to the duration of a whole number N of half cycles of a wave at the carrier frequency $Fo$ of said frequency modulated wave; a third channel comprising means for impressing on a signal propagating therethrough a delay equal to $s/2$; said channels having respective outputs; means for performing an algebraical addition, said means having two inputs, respectively coupled to the outputs of said first and second channels, and having a further output; a second general input; means for feeding to said second general input a sinusoidal oscillation having an angular frequency $w$, and a circuit having three inputs, respectively coupled to said further output, to the output of said third channel and to said second general input, said circuit including frequency converting means for combining the signals fed thereto to provide said amplitude modulated wave.

2. An FM/AM converter according to claim 1, wherein said means for performing an algebraical addition is adder means, N being an odd integer.

3. An FM/AM converter according to claim 1, wherein said means for performing an algebraical addition is subtracting means, N being an even integer.

4. An FM/AM converter for converting a wave of constant amplitude which is frequency modulated by a signal $M(t)$ into an amplitude modulated wave of the suppressed carrier type, of the form $k.M(t) \sin (w_1 t+P)$, where $k$, $w_1$ and P are constants, said FM/AM converter comprising: a first general input for receiving said frequency-modulated wave; an undelayed channel, a first delayed channel and a second delayed channel having respective inputs coupled to said general input and respective outputs, said first delayed channel comprising a delay device imparting to the input signals of said first delayed channel a delay having a duration $s$ equal to that of a whole number N of half cycles of the resting frequency of the frequency modulated wave, and said second delayed channel comprising a delay device imparting to the input signals of said second delayed channel a delay having a duration $s/2$; an algebraical addition device, which is an adder if N is odd, and a subtractor if N is even, having two inputs respectively coupled to the outputs of said undelayed channel and of said first delayed channel and an output; a second general input; means for applying to said second general input a sinusoidal wave having the angular frequency $w_1$; a first frequency converter having two inputs respectively coupled to the output of said second delayed channel and to said second general input; and a second frequency converter having two inputs respectively coupled to the output of said first frequency converter and to the output of said algebraical addition device.

No references cited.

ROY LAKE, *Primary Examiner.*

A. L. BRODY, *Assistant Examiner.*